(12) United States Patent
Veteläinen

(10) Patent No.: US 7,483,845 B2
(45) Date of Patent: Jan. 27, 2009

(54) METHODS, SYSTEM, AND COMPUTER READABLE MEDIUM FOR USER DATA ENTRY, AT A TERMINAL, FOR COMMUNICATION TO A REMOTE DESTINATION

(75) Inventor: Altti Pekka Henrik Veteläinen, Kiiminki (FI)

(73) Assignee: Nokia Corporation, Espoo (FI)

( * ) Notice: Subject to any disclaimer, the term of this patent is extended or adjusted under 35 U.S.C. 154(b) by 528 days.

(21) Appl. No.: 10/606,177

(22) Filed: Jun. 24, 2003

(65) Prior Publication Data

US 2004/0267688 A1 Dec. 30, 2004

(51) Int. Cl.
G06Q 30/00 (2006.01)
G06F 17/30 (2006.01)
(52) U.S. Cl. ................................ 705/26; 705/1; 705/27
(58) Field of Classification Search ............. 705/26–27, 705/1
See application file for complete search history.

(56) References Cited

U.S. PATENT DOCUMENTS

| | | | | |
|---|---|---|---|---|
| 5,963,924 A * | 10/1999 | Williams et al. | ............... | 705/40 |
| 6,018,724 A * | 1/2000 | Arent | ........................... | 705/44 |
| 6,125,352 A * | 9/2000 | Franklin et al. | ............... | 705/26 |
| 6,607,136 B1 * | 8/2003 | Atsmon et al. | ............... | 235/492 |
| 6,873,974 B1 * | 3/2005 | Schutzer | ...................... | 705/41 |
| 2001/0029496 A1 * | 10/2001 | Otto et al. | ...................... | 705/74 |
| 2001/0043198 A1 * | 11/2001 | Ludtke | ....................... | 345/173 |
| 2001/0049635 A1 * | 12/2001 | Chung | .......................... | 705/26 |
| 2002/0013788 A1 * | 1/2002 | Pennell et al. | ............... | 707/507 |
| 2002/0016749 A1 * | 2/2002 | Borecki et al. | ................. | 705/26 |
| 2002/0026419 A1 * | 2/2002 | Maritzen et al. | .............. | 705/41 |
| 2002/0042747 A1 * | 4/2002 | Istvan | .......................... | 705/26 |
| 2002/0057678 A1 * | 5/2002 | Jiang et al. | ................... | 370/353 |
| 2002/0077978 A1 * | 6/2002 | O'Leary et al. | ............... | 705/40 |
| 2002/0077993 A1 * | 6/2002 | Immonen et al. | .............. | 705/77 |
| 2002/0083013 A1 * | 6/2002 | Rollins et al. | .................. | 705/76 |
| 2002/0147653 A1 * | 10/2002 | Shmueli et al. | ................ | 705/26 |
| 2002/0186255 A1 * | 12/2002 | Shafron et al. | .............. | 345/810 |
| 2003/0159071 A1 * | 8/2003 | Martinez et al. | ............ | 713/202 |
| 2004/0031856 A1 * | 2/2004 | Atsmon et al. | ............... | 235/492 |
| 2004/0243520 A1 * | 12/2004 | Bishop et al. | .................. | 705/75 |

FOREIGN PATENT DOCUMENTS

EP 1 168 264 A2 11/2000
WO WO-01/16900 A2 3/2001

OTHER PUBLICATIONS

"One-click cards in vogue". Cards International May 26, 2000 Journal Code: WCAI [recovered from Dialog Database on Aug. 20, 2008].*

* cited by examiner

*Primary Examiner*—Jeffrey A. Smith
*Assistant Examiner*—William J. Allen
(74) *Attorney, Agent, or Firm*—Harrington & Smith, PC

(57) ABSTRACT

A method of user data entry in communicating to a remote destination from a terminal includes displaying at least one data entry field to a user, automatically displaying a user selectable option in response to user selection of the data entry field, and providing access to an electronic wallet application for the transfer of data into the data entry field in response to user selection of the selectable option.

15 Claims, 3 Drawing Sheets

METHODS, SYSTEM, AND COMPUTER READABLE MEDIUM FOR USER DATA ENTRY, AT A TERMINAL, FOR COMMUNICATION TO A REMOTE DESTINATION

FIELD OF THE INVENTION

Embodiments of the invention relate to the user entry of data at a terminal for communication to a remote destination. Some of these methods may, in particular, relate to facilitating an online electronic commerce transaction requiring user data entry at an Internet terminal for communication to a remote electronic commerce server.

BACKGROUND TO THE INVENTION

At present it is possible for electronic commerce transaction to be made using web sites accessed through the Internet. Such e-commerce allows products and services to be purchased direct via web sites maintained by manufacturers or retailers of products. Recently, mobile cellular telephones with Internet functionality have been developed, facilitating mobile electronic commerce (m-commerce).

An electronic commerce transaction normally requires a purchaser to supply the vendor with personal data such as credit card details, delivery address, contact details etc. This information must therefore be transferred from the purchaser to the vendor. This is normally achieved by providing a form on the web-site, which the purchaser is expected to complete. The filling-in of such a form slows down the payment transaction and, being laborious, reduces a consumer's willingness to complete the transaction.

So-called electronic wallet application programs have been developed in order to facilitate the transfer of personal data while maintaining the security and confidentiality of that data.

An electronic wallet application is a mechanism that collects and protects personal data e.g. bank card details, contact details and personal details. An electronic wallet application is usually attached to a browser application of an Internet terminal and it enables data to be transferred from the wallet to a remote sever via a form on the web-site. The automatic filling of fields in a web-site form by an electronic wallet is provided by the open Internet standard (IETF RFC 2706) ECML (Electronic Commerce Modeling Language).

There are, however, drawbacks related to the use of an electronic wallet. The tool bar of the web browser on the terminal contains an additional appropriate icon that takes up space. This is a particular problem for handheld mobile terminals, such as mobile cellular telephones, which have limited size displays.

EP02396148 (unpublished) describes the display of a wallet icon, for user selection, only if the current web-page supports the ECML standard.

However, not all web pages that require personal data will support the ECML standard, in which case the automatic data transfer based on ECML fields in a wallet program cannot be utilized.

It would be desirable to provide an alternative way of using an electronic wallet application.

BRIEF SUMMARY OF THE INVENTION

According to one aspect of the invention there is provided a method of user data entry, at a terminal, for communication to a remote destination comprising the steps of: a) displaying at least one data entry field to a user; b) automatically displaying a user selectable option in response to user selection of the data entry field; and c) providing access to an electronic wallet application, for the transfer of data into at least the data entry field, in response to user selection of the option.

According to a further aspect of the present invention there is provided a data entry terminal, for communication of data entered by a user to a remote destination, comprising: a display; a user input interface for selection of the data entry field and a displayed option; and a processor operable: to detect the user selection of a displayed data entry field; to provide a user selectable option automatically in the display, in response to the detection of the user selection of the displayed data entry field; to detect user selection of the displayed option; and to provide access to an electronic wallet application, for the transfer of data into the data entry field, in response to the detection of the user selection of the option.

According to another aspect of the present invention there is provided a method of facilitating an online electronic commerce transaction requiring the user entry of data at an internet terminal for communication to a remote electronic commerce server comprising the steps of: displaying at least one data entry field to a user; automatically displaying a user selectable device in response to user selection of the data entry field; and providing access to an electronic wallet application, for the transfer of data into at least the data entry field, in response to user selection of the displayed device.

According to another aspect of the invention there is provided a method of user data entry, at a terminal, for communication to a remote destination comprising the steps of:
(a) displaying at least one data entry field to a user;
(b) automatically detecting whether a wallet application is enabled;
(c) displaying an icon, for user selection, if a wallet application is enabled; and
(d) providing access to the electronic wallet application, for the transfer of data into at least the data entry field, in response to user selection of the icon.

An advantage of embodiments of the invention is that space on the tool bar of the browser is not used unnecessarily. Another advantage is that it adds to the intuitiveness of the browser user interface, by only presenting an option when it is appropriate to select it. Another advantage is that it is easier to fill in fields that do not support the ECML standard.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

Figure 1:
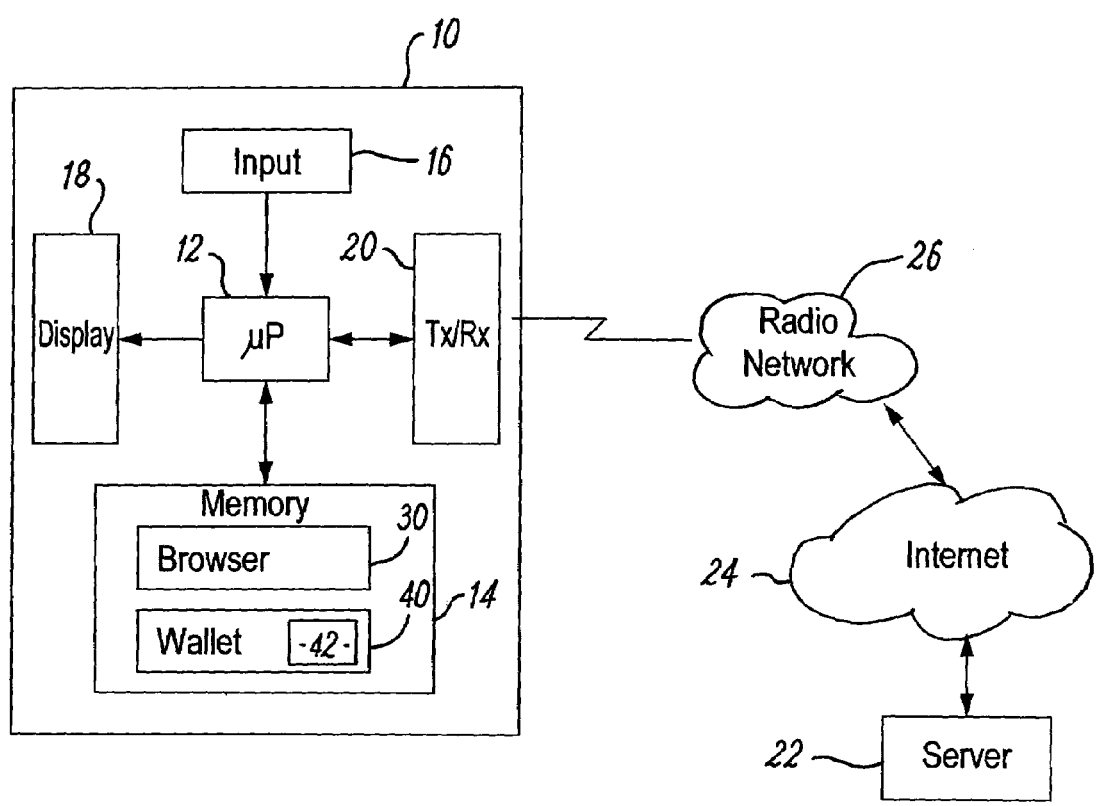
FIG. 1 illustrates a mobile internet terminal.

FIG. 1 illustrates a mobile internet terminal, in this case a mobile cellular telephone 10. The terminal 10 comprises: a processor 12; a memory 14; a user input interface 16; display 18; and a radio transceiver 20 for communicating with a remote server 22 in the Internet 24 via a cellular radio network. 26.

The user input interface 16 includes a selection mechanism and a cursor positioning device. These may be provided, for example, by a keypad, a touch sensitive screen or a joy-stick.

The memory 14 stores a browser application program 30 and an a electronic wallet application program 40 and its associated personal data 42

Figure 2A:
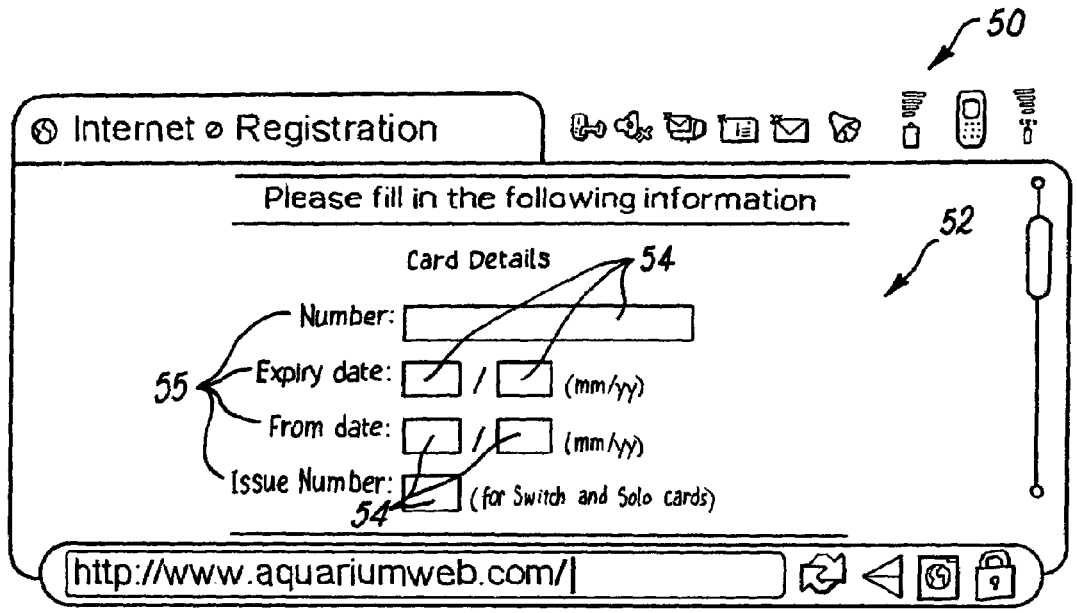
FIGS. 2A illustrates a web page with a data entry field

The browser application 30 interprets mark-up language (e.g. HTML, WML, XML) code received from the server 22 and displays a web page 50 on the display 18. The web page 50 is illustrated in FIG. 2A. The web page 50 includes a form 52 that has one or more data entry fields 54 for receiving data input by a user. Each data entry field 54 normally has an associated label 55 indicating the purpose of the data entry field 54.

The browser application program 30 includes program instructions for performing the inventive method as described with reference to FIG. 3. These instructions may be integrated within the browser application or may be a plug-in to the browser application.

The electronic wallet application 40, when loaded into the processor 12, enables the transfer of personal data 42 into the data entry field 54 of the web page 52.

Figure 3:
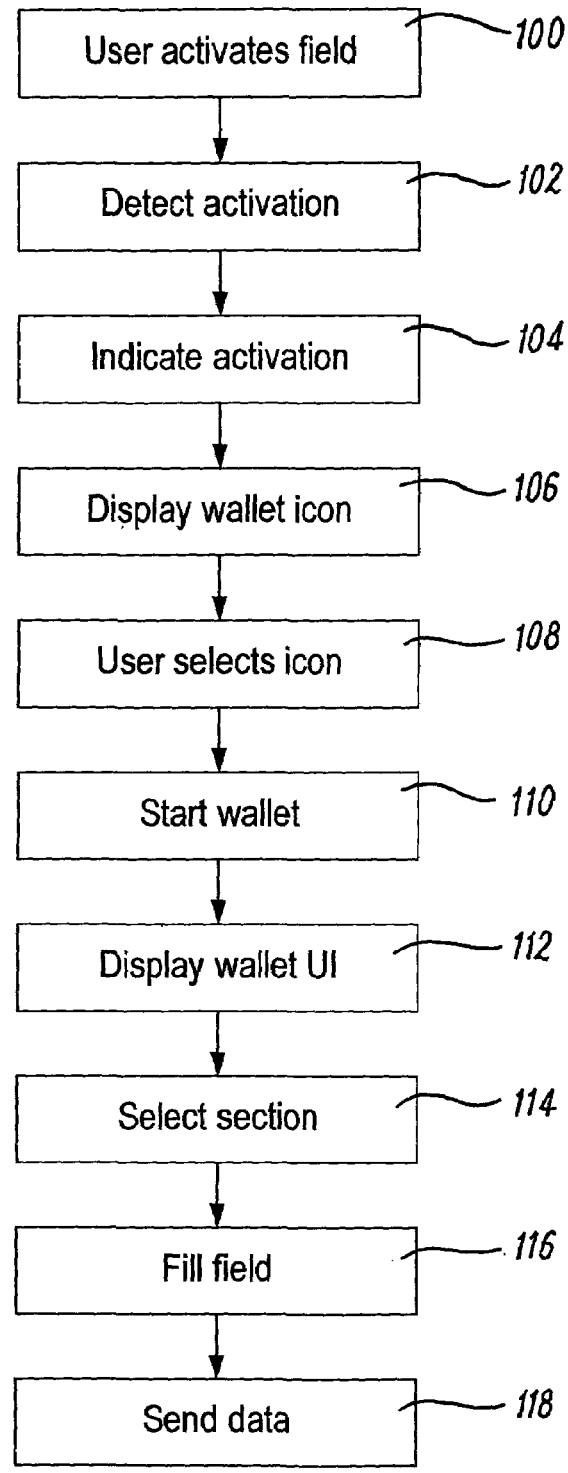
FIG. 3 illustrates a method of data entry at a web page using an electronic wallet application.

A method of user data entry is illustrated in FIG. 3. The method uses a web page 50 that includes a form 52 that has one or more data entry fields 54, as illustrated in FIG. 2A.

At step 100, the user activates data entry field 54 This activation may be achieved by using a keystroke that is equivalent to the "tab" function of a keyboard or by positioning a cursor over the data entry field and actuating the selection mechanism.

At step 102, the browser application 30 detects the activation of the data entry field 54

Figure 2B:
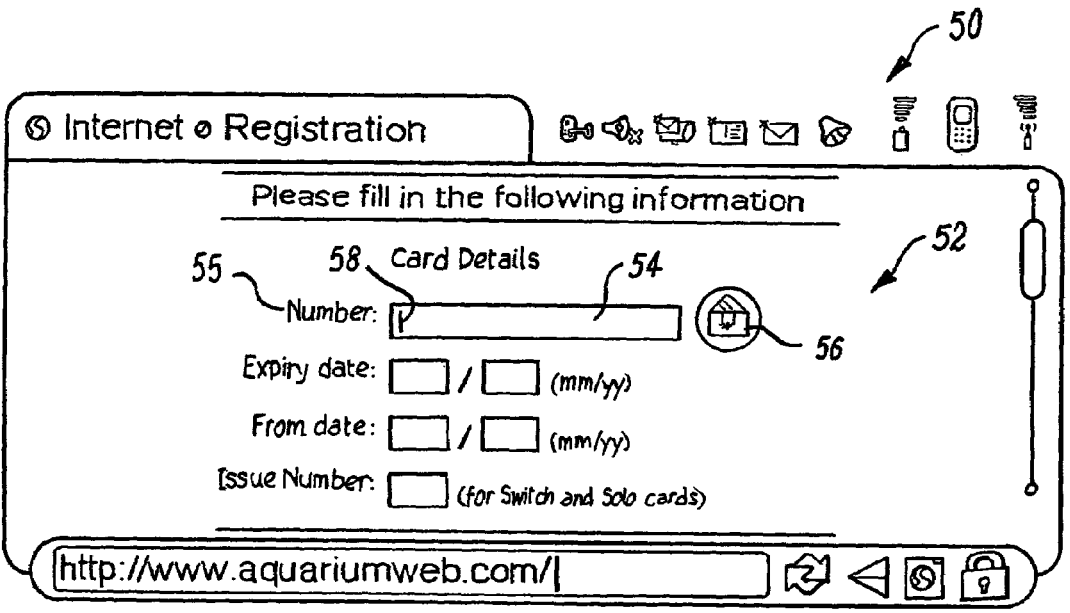
FIGS. 2B illustrates a web page with a data entry field and a Wallet Activation Icon.

At step 104, in response to the detection at step 102, the browser application 30 controls the display 18, to indicate that the data entry field 54 has been successfully activated. For example, a blinking cursor 58 may be positioned within the data entry field 54 (as shown in FIG. 2B) and/or the label 55 of the data entry field 54 may be highlighted.

At step 106, in response to the detection step 102, the browser application 30 launches a Wallet Activation Icon 56 adjacent the activated data entry field 54. The position of the newly displayed icon 56 is preferably to the right hand side of the data entry field 54 (as shown in FIG. 2B), so that the data entry field is 'sandwiched' between the label 55 and the icon 56, however, the icon 56 may be positioned at any suitable location within the display 18.

Although the figure illustrates step 106, as following step 104, the order is not important and the steps may be contemporaneous.

At step 108, the user selects the icon 56. This may be achieved by a key-stroke sequence equivalent to 'tab; and 'enter' or by positioning a cursor over the icon 56 and actuating the selection mechanism.

At step 110, the browser application 30 responds to the selection of the icon 56 by calling the electronic wallet application. The initial start routine of the wallet application 30 is for protecting access to the personal data within the electronic wallet and a security dialog box is displayed with a data entry field. The user then enters a valid secret such as a password into this data entry field.

At step 112, after successfully completing the security routine, the electronic wallet application is fully activated and the wallet user interface is displayed.

At step 114, the user selects an appropriate section of the wallet user interface. For example, the user can select the wallet section(for example payment card, loyalty card, address card etc) which is required to fill this Web page's data entry fields 54.

At step 116, the data entry field is filled from the selected wallet item of the wallet application. There are two ways to fill the data entry fields: automatic or manual fill.

Automatic fill uses electronic commerce modelling language (ECML) standard to place the correct personal data from the electronic wallet in the correct data entry field. Automatic fill can only be used on the web pages, which support the ECML standard.

Manual fill allows a user to fill data entry fields one by one with the selected values and it does not use the ECML standard. The user selects the personal data, which he wants to transfer to the previously activated data entry. An option to transfer the selected personal data to the activated data entry field is then presented to the user. Selection of this option by the user transfers the selected personal data to the activated data entry field.

At step 118, the user is presented with an option to confirm the transaction on the display 18 and the data entered into the data entry fields 54 is sent by the browser application 30 to the remote server 22.

The above described method may be performed under the control of a computer program comprising program instructions. The computer program may be loaded into the mobile internet terminal from a record medium or carrier on which it is embodied.

Although embodiments of the present invention have been described in the preceding paragraphs with reference to various examples, it should be appreciated that modifications to the examples given can be made without departing from the scope of the invention as claimed.

For example, although described with reference to a mobile Internet terminal, the invention is applicable to any suitable terminal, including a fixed Internet terminal.

For example, the browser application may have a setting that allows the electronic wallet application to be disabled or enabled. When it is enabled, the process occurs as described above. When it is disabled, the steps 106 onwards do not occur and the user enters the data to the data entry field character by character. 11. The display of the wallet icon (step 106) is therefore conditional on whether the wallet application is enabled or disabled.

For example, the steps after step 106 may not occur if the terminal does not have access to a wallet application. The terminal may have access to a wallet application if the application is stored in the terminal or a device connected with the terminal such as a smart card. Therefore, the display of the wallet icon (step 106) may consequently be conditional on whether the wallet application is available or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon."

The invention claimed is:

1. A method comprising:
   a) displaying to a user at least one data entry field on a terminal for communication to a remote destination;
   b) selecting the at least one data entry field through a user input;
   c) automatically displaying a user selectable icon in proximity to the at least one data entry field in response to user selection of the data entry field;

d) selecting the user selectable icon through another user input;
e) in response to the selection of the user selectable icon, calling a security routine of an electronic wallet application which prompts the user for a password; and
f) upon successful entry of the password by the user in the security routine, granting access to the user to the electronic wallet application for transfer of data into the data entry field.

2. A method as claimed in claim 1, wherein the wallet application includes a secure collection of personal data.

3. A method as claimed in claim 2, wherein at least some of the personal data is for completing an electronic commerce transaction.

4. A method as claimed in claim 1, wherein the terminal is an Internet terminal.

5. A method as claimed in claim 1, wherein the terminal is a handheld mobile Internet terminal.

6. A method as claimed in claim 4, wherein the remote destination is an electronic commerce server.

7. A method as claimed in claim 4, wherein steps a), c), and e) are provided by a browser application.

8. A method as claimed in claim 1, further comprising displaying the user selectable icon in a position adjacent the data entry field.

9. A method as claimed in claim 1, further comprising automatically transferring data from the electronic wallet application into the data entry field, in response to user selection of the icon.

10. A method as claimed in claim 1, further comprising providing for user selectable transfer of data from the electronic wallet application into the data entry field, in response to user selection of the icon.

11. A computer recording medium physically encoded with a computer program comprising:
a) computer code for displaying at least one data entry field on a terminal to a user where the terminal is configured to communicate with a remote destination;
b) computer code for processing a selection of the at least one data entry field by the user;
c) computer code for automatically displaying a user selectable icon in proximity to the at least one data entry field in response to user selection of the data entry field;
d) computer code for processing a selection of the user selectable icon by the user;
e) computer code for calling a security routine of an electronic wallet application in response to the selection of the user selectable icon; and
f) computer code for providing, to the user, access to the an electronic wallet application, for the transfer of data into the data entry field in response to successful completion of the security routine.

12. An apparatus comprising:
a display;
a user input interface for selection of a data entry field and a displayed icon; and
a processor operable:
to control the display on the apparatus of the data entry field;
to detect the selection of the displayed data entry field by the user;
to provide a user selectable icon automatically in the display in proximity to the data entry field, in response to the detection of the user selection of the displayed data entry field;
to detect user selection of the displayed icon;
to call a security subroutine of an electronic wallet application upon detection of the user selection of the displayed icon; and
to grant access to the electronic wallet application from a remote location to the apparatus for transfer of data into the data entry field upon successful completion of the security routine by the user.

13. An apparatus according to claim 12, wherein the apparatus comprises a data entry terminal for communication of data entered by the user to a remote destination.

14. A method comprising:
(a) displaying on a terminal for communication to a remote destination at least one data entry field to a user;
(b) selecting the at least one data entry field through a user input;
(c) detecting user selection of the displayed data entry field;
(d) automatically detecting whether a wallet application is enabled;
(e) displaying an icon in proximity to the at least one data entry field, for user selection, if an electronic wallet application is enabled, and not displaying the icon if the electronic wallet application is not enabled;
(f) selecting the icon through another user input;
(g) calling a security routine of the electronic wallet application in response to the user selection of the user selectable icon in which the user is prompted to provide a password; and
(h) providing access to the electronic wallet application, for the transfer of data into at least the data entry field, upon successful completion of the security routine.

15. A method comprising:
displaying a data entry field on a user interface of a terminal;
activating the data entry field through one of 1) a keystroke and 2) a cursor positioned over the data entry field and activating a selection mechanism;
upon activating the data entry field, displaying a wallet activation icon in proximity to the data entry field;
partially invoking the wallet application by selecting the wallet activation icon by one of 1) a keystroke and 2) a cursor positioned over the data entry field and activating a selection mechanism;
upon partially invoking the wallet application, displaying a security dialog box with a data entry field via an initial start routine of the invoked wallet application for entry of a valid secret;
upon successful entry of the valid secret in the data field of the security dialog box, fully activating the electronic wallet application such that a wallet user interface is displayed;
selecting a wallet section of the wallet user interface; and
filling the data entry field displayed on the user interface from the selected wallet section.

* * * * *

UNITED STATES PATENT AND TRADEMARK OFFICE
CERTIFICATE OF CORRECTION

PATENT NO. : 7,483,845 B2
APPLICATION NO. : 10/606177
DATED : January 27, 2009
INVENTOR(S) : Vetelainen Page 1 of 1

It is certified that error appears in the above-identified patent and that said Letters Patent is hereby corrected as shown below:

In The Claims:

In Claim 14, Column 6, line 19, delete "selecting" and replace with --selecting--

Signed and Sealed this

Fourteenth Day of April, 2009

JOHN DOLL
*Acting Director of the United States Patent and Trademark Office*